(12) United States Patent
Dölker

(10) Patent No.: US 7,021,293 B2
(45) Date of Patent: Apr. 4, 2006

(54) METHOD FOR THE AUTOMATIC CONTROL OF AN INTERNAL COMBUSTION ENGINE-GENERATOR UNIT

(75) Inventor: Armin Dölker, Immenstaad (DE)

(73) Assignee: MTU Friedrichshafen GmbH, (DE)

( * ) Notice: Subject to any disclaimer, the term of this patent is extended or adjusted under 35 U.S.C. 154(b) by 0 days.

(21) Appl. No.: 11/060,176

(22) Filed: Feb. 17, 2005

(65) Prior Publication Data

US 2005/0183700 A1    Aug. 25, 2005

(30) Foreign Application Priority Data

Feb. 20, 2004    (DE) ................. 10 2004 008 261

(51) Int. Cl.
    *F02M 51/00*    (2006.01)
(52) U.S. Cl. ........................ 123/486; 123/436
(58) Field of Classification Search ............ 123/486, 123/436, 696, 478, 357
    See application file for complete search history.

(56) References Cited

U.S. PATENT DOCUMENTS

| | | | | |
|---|---|---|---|---|
| 4,397,285 A | * | 8/1983 | O'Neill | 123/502 |
| 4,559,915 A | * | 12/1985 | Naganawa et al. | 123/406.47 |
| 4,718,387 A | * | 1/1988 | Shinchi et al. | 123/478 |
| 4,825,369 A | * | 4/1989 | Oshizawa | 701/105 |
| 4,862,853 A | * | 9/1989 | Tsukamoto et al. | 123/357 |
| 5,277,165 A | * | 1/1994 | Matsuo | 123/492 |
| 5,647,326 A | * | 7/1997 | Kato et al. | 123/500 |
| 5,832,901 A | * | 11/1998 | Yoshida et al. | 123/478 |

FOREIGN PATENT DOCUMENTS

| | | |
|---|---|---|
| DE | 44 46 246 C2 | 1/1996 |
| DE | 199 37 139 C1 | 4/2001 |

* cited by examiner

*Primary Examiner*—Mahmoud Gimie
(74) *Attorney, Agent, or Firm*—Klaus P. Stoffel

(57) ABSTRACT

An automatic control method for a load application for an internal combustion engine-generator unit. The method includes computing a first injection start at a steady-state speed by an injection start input-output map and setting this first injection start as the controlling injection start. When a load application is detected, the first injection start is shifted by the injection start correction as a function of a speed control deviation.

9 Claims, 8 Drawing Sheets

METHOD FOR THE AUTOMATIC CONTROL OF AN INTERNAL COMBUSTION ENGINE-GENERATOR UNIT

BACKGROUND OF THE INVENTION

The invention concerns a method for the automatic control of an internal combustion engine-generator unit.

DE 199 37 139 C1 describes a method for the automatic control of an internal combustion engine-generator unit, in which the speed of the internal combustion engine is monitored in a closed-loop speed control system. With the detection of a significant load change on the power takeoff of the internal combustion engine, the injection start is additionally shifted towards late in terms of smaller crankshaft angles before top dead center. A significant load change on the power takeoff is understood to mean, in the case of use in a ship, the broaching of the ship's propulsion unit and, in the case of generator operation, load rejection. The shift in the injection start is produced by special design of the injection start input-output map. The method cannot be applied to a load application.

DE 44 46 246 C2 describes a method for the closed-loop control of the load behaviour of an internal combustion engine-generator unit. In this method, when a load application is detected, the injection start is additionally shifted towards early for automatic speed control. This shift occurs as a function of the internal cylinder pressure or a manifold pressure of the exhaust turbocharger. However, the method is complicated with respect to adjustment.

In practice, the injection start input-output map for an internal combustion engine generator application is adjusted in the region of the steady-state speed in test stand tests. The steady-state speed corresponds to a speed value of 1,500 rpm in a 50-Hz application and a speed value of 1,800 rpm in a 60-Hz application. The speed values below this steady-state speed are associated with early injection start values in the input-output map. These early injection starts are intended to counteract the speed drop when a load is applied. This results in the problem that these speed values and these injection start values are also passed through during the run-up of the internal combustion engine-generator unit. Since these values are not optimum, unfavorable operating values of the internal combustion engine are realized. In addition, the run-up time from the start-up of the internal combustion engine to the rated speed can be prolonged. Another problem that arises in an internal combustion engine-generator unit that is operated with a power level according to a desired speed adjustment is that the injection start is not shifted towards early until the speed has already dropped significantly, so that the effect of the shift in the injection start is very small.

SUMMARY OF THE INVENTION

The object of the invention is to provide an automatic control method for an internal combustion engine-generator unit, which is easy to adjust and allows a reliable run-up and a quick response when a load is applied.

The invention provides that the injection start during a load application is adjusted by computing a first injection start by means of an injection start input-output map and varying this first injection start by an injection start correction as a function of the speed control deviation. The invention thus provides for a functional separation of the injection start computation for steady-state and transient operation. In steady-state operation, i.e., at a constant speed of, e.g., 1,500 rpm, the injection start is defined exclusively by the injection start input-output map. Therefore, this map only has to be adjusted for the steady-state speed values. In transient operation in the sense of a load application, the injection start is varied by the injection start correction. For this purpose, the injection start correction is varied as a function of the speed control deviation. Another advantage of the invention is that during a load application, the response time of the internal combustion engine-generator unit is improved, i.e., the spontaneity is increased.

In a refinement of the invention, the injection start is limited to a maximum injection start, which is computed as a function of the desired injection amount and the actual speed. This protects the internal combustion engine from impermissible loads.

The injection start correction is first activated when an end of the run-up of the internal combustion engine is detected. In this way, the injection start values of the injection start input-output map are valid during the run-up.

In a further refinement of the invention, to filter the speed, i.e., the controlled value of the closed-loop speed control system, a filter is used which has a small filter angle, e.g., a 90° crankshaft angle. Especially quiet engine running is achieved if the injection start has few fluctuations in steady-state operation. This is achieved by filtering the output of the injection start input-output map or, alternatively, by filtering the input variables of this input-output map.

A preferred embodiment of the invention is illustrated in the drawings.

Other features and advantages of the present invention will become apparent from the following description of the invention that refers to the accompanying drawings.

DESCRIPTION OF THE INVENTION

Figure 1:
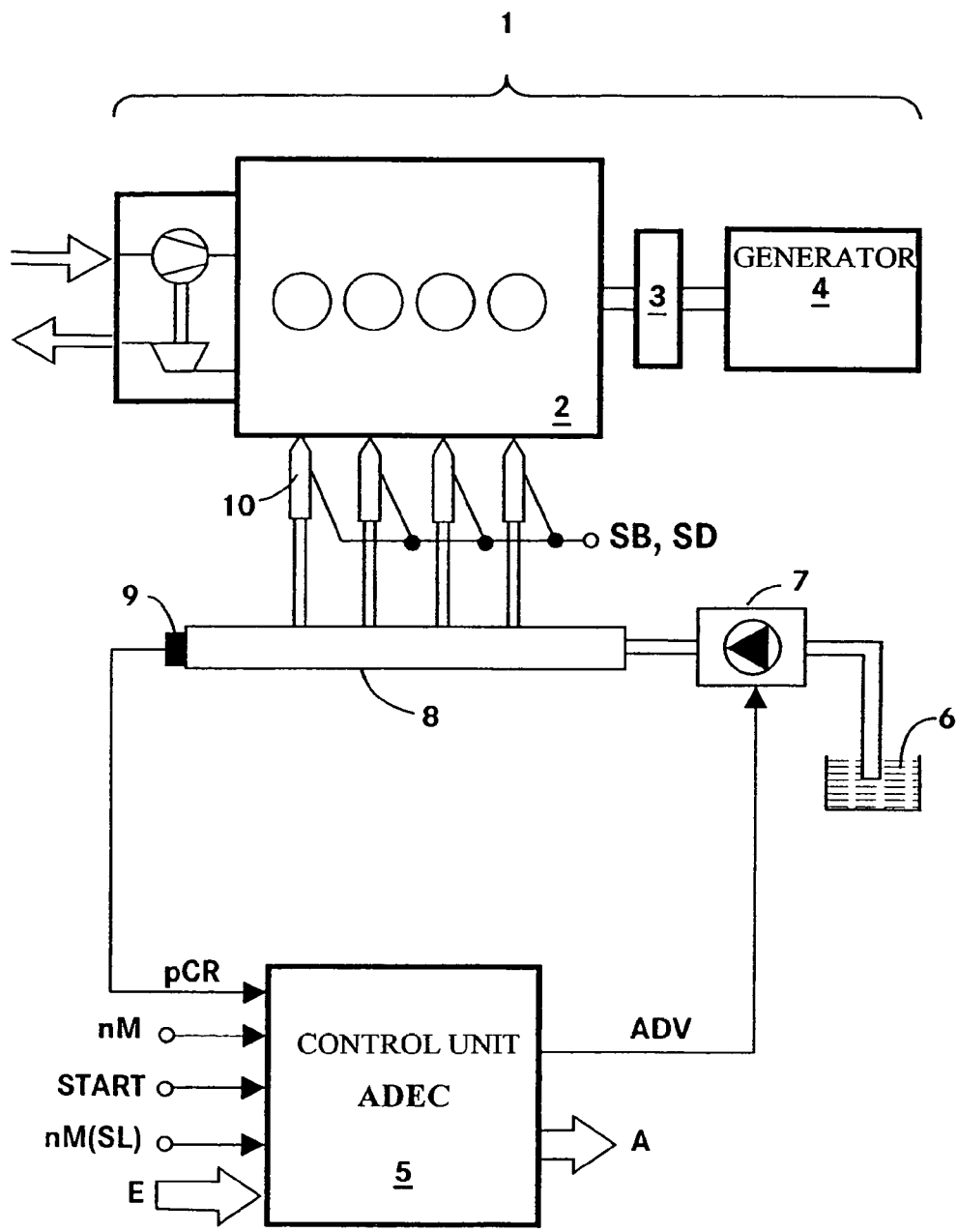
FIG. 1 shows a system diagram.

FIG. 1 shows a system diagram of the overall system of an internal combustion engine-generator unit 1, which consists of an internal combustion engine 2 with a generator 4. The internal combustion engine 2 drives the generator 4 via a shaft and coupling 3. The illustrated internal combustion engine 2 has a common-rail injection system. This injection system comprises the following components: pumps 7 with a suction throttle for conveying the fuel from a fuel tank 6, a rail 8 for storing the fuel, and injectors 10 for injecting the fuel from the rail 8 into the combustion chambers of the internal combustion engine 2.

The internal combustion engine is automatically controlled by an electronic control unit (ADEC) 5. The electronic control unit 5 contains the conventional components of a microcomputer system, for example, a microprocessor, interface adapters, buffers, and memory components (EE- PROM, RAM). The relevant operating characteristics for the operation of the internal combustion engine 2 are applied in the memory components in input-output maps/characteristic curves. The electronic control unit 5 uses these to compute the output variables from the input variables. FIG. 1 shows the following input variables as examples: a rail pressure pCR, which is measured by means of a rail pressure sensor 9, a speed signal nM of the internal combustion engine 2, a signal START for activating the internal combustion engine-generator unit 1, a speed set value nM(SL) for the set-point assignment by the operator, and an input variable E. Examples of input variables E are the manifold pressure of a turbocharger and the temperatures of the coolant/lubricant and the fuel.

As output variables of the electronic control unit 5, FIG. 1 shows a signal ADV for controlling the pumps 7 with a suction throttle and an output variable A. The output variable A is representative of the other control signals for automatically controlling the internal combustion engine 2, for example, the injection start SB and the injection time SD.

Figure 2:
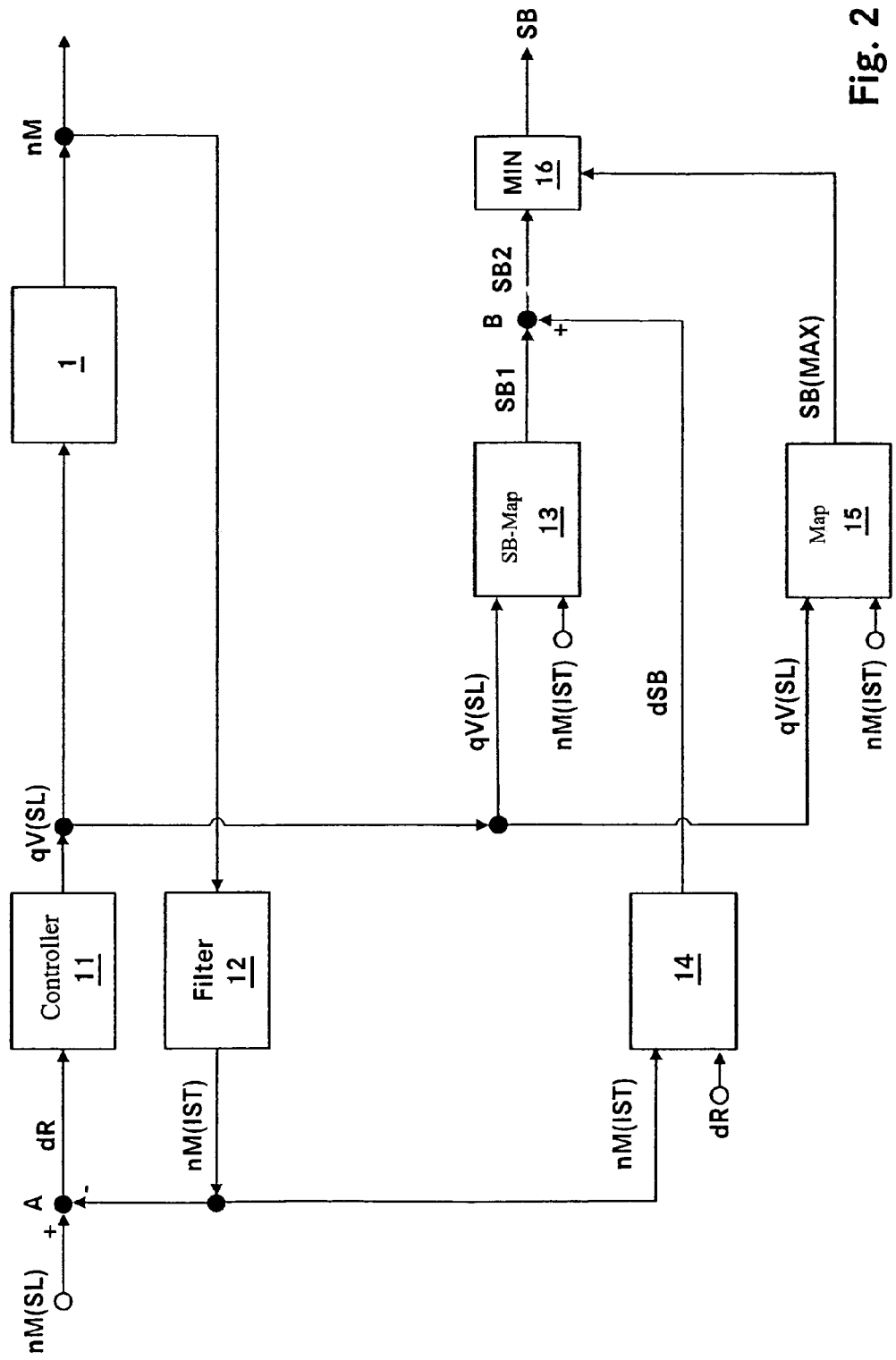
FIG. 2 shows a functional block diagram for the injection start.

FIG. 2 shows a functional block diagram for determining the injection start SB with a closed-loop speed control system. The closed-loop speed control system comprises a speed controller 11, the internal combustion engine/generator unit 1 as the controlled system, and a first filter 12. As the controlled value, the raw values of the speed nM are detected and converted by the first filter 12 to the actual speed nM(IST). In practice, the first filter 12 is designed, for example, as a 1-revolution filter, i.e., it has a filter angle of 360° crankshaft angle. At a summing point A, a speed control deviation dR is determined from the difference of the speed set value nM(SL) and the actual speed nM(IST). This speed control deviation dR is converted to a correcting variable, here a set injection quantity qV(SL), by the speed controller 11. The correcting variable is equivalent to a power-determining signal. In this regard, it can also involve a set torque or a set injection pump control rod distance. The controlled system is then acted upon by the correcting variable. The control system is thus closed.

A first injection start SB1 is computed by means of an injection start input-output map 13 from the set injection quantity qV(SL) and the actual speed nM(IST). The injection start input-output map 13 is adjusted for steady-state operation. An injection start correction dSB is determined by means of a functional block 14 from the actual speed nM(IST) and the speed control deviation dR. The functional block 14 is shown in greater detail in FIG. 3 and is explained with reference to FIG. 3. The first injection start SB1 and the injection start correction dSB are added at a summing point B. The result corresponds to a second injection start SB2. An input-output map 15 is used to compute a maximum injection start SB(MAX) as a function of the set injection amount qV(SL) and the actual speed nM(IST). A minimum value selection unit 16 sets either the second injection start SB2 or the maximum injection start SB(MAX) as the current injection start SB. The injection start SB is thus limited by the maximum injection start SB(MAX).

It is apparent from the functional block diagram in FIG. 2 that the injection start computation for steady-state operation is functionally separated from the injection start computation for transient operation. In steady-state operation, i.e., at constant speed, the injection start SB corresponds to the first injection start SB1, which is computed by means of the input-output map 13. When a load application is detected, the injection start SB corresponds to the sum of the first injection start SB1 and the injection start correction dSB. The injection start correction dSB causes a shift in the injection start towards early.

Figure 3:
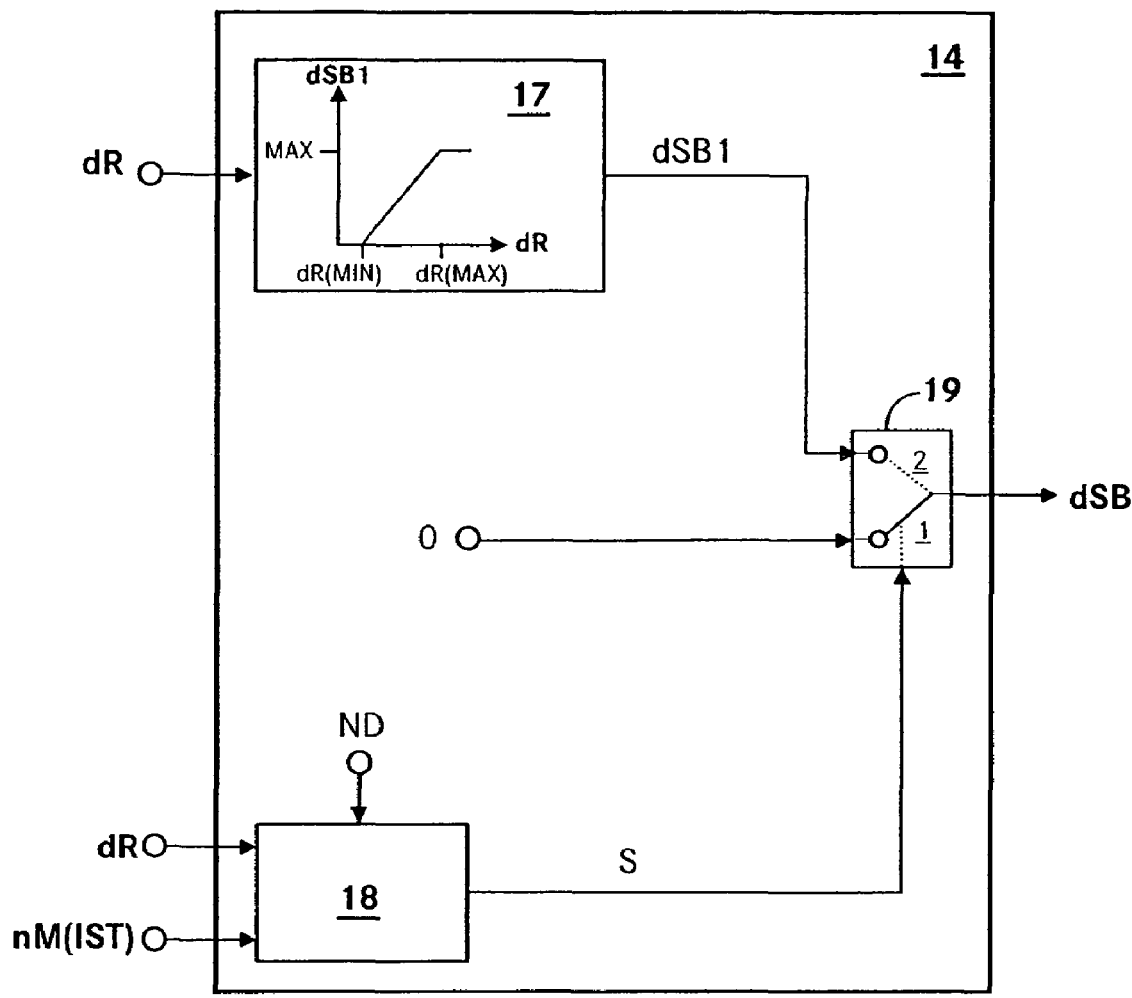
FIG. 3 shows a functional block diagram for the injection start correction.

FIG. 3 shows a functional block diagram for determining the injection start correction dSB by means of the functional block 14. The functional block 14 comprises a characteristic curve 17 for determining a correction value dSB1, a functional block 18 for determining a switch position, and a switch 19. The switch 19 is shown in position 1. Position 1 corresponds to the initial state, i.e., the state when the engine is being started up. In this position, the injection start correction dSB has the value zero. The position of the switch 19 is determined by the signal S. The signal S is determined by the functional block 18 as a function of the speed control deviation dR and the actual speed nM(IST). The signal S changes its value when an end of the run-up of the internal combustion engine-generator unit 1 is first recognized. In other words, the switch 19 changes its position from 1 to 2 when the actual speed nM(IST) is greater than or equal to the rated speed ND, and the control deviation dR is less than or equal to zero. In position 2 of the switch 19, the injection start correction dSB corresponds to the correction value dSB1 determined by the characteristic curve 17 as a function of the control deviation dR. In this regard, the characteristic curve 17 is realized in such a way that the correction value dSB1 has a value different from zero when the speed control deviation dR becomes greater than a limiting value, which in this case is dR(MIN). The characteristic curve 17 is realized, for example, in such a way that the correction value dSB1 assumes the value MAX when the speed control deviation dR exceeds the value dR(MAX). The switch 19 remains in position 2 for the further operation of the engine. It changes back to position 1 only when the engine is shut off.

Figure 4:
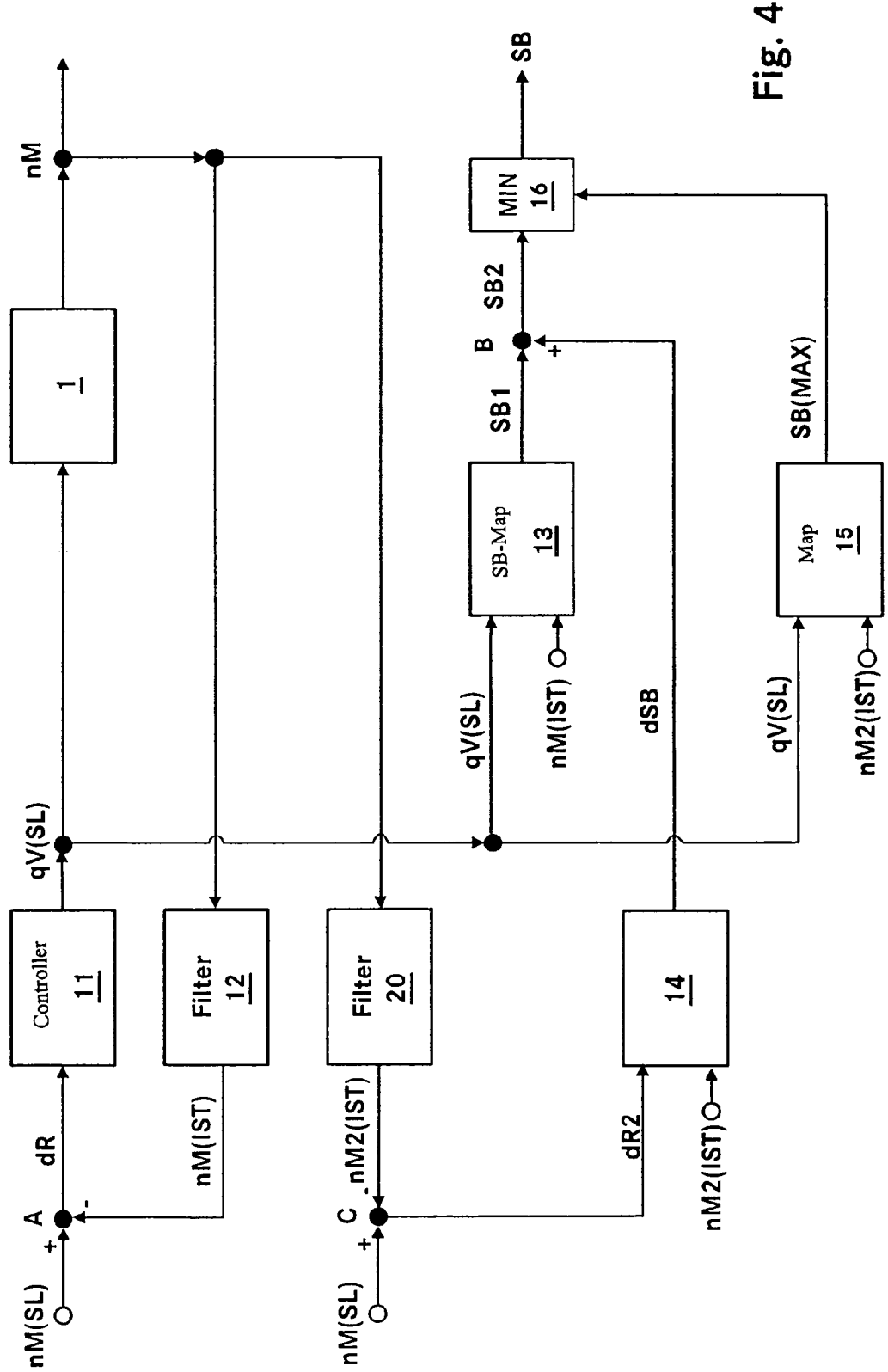
FIG. 4 shows a functional block diagram for the injection start with a fast speed filter.

FIG. 4 shows a functional block diagram for computation of the injection start with a second filter 20. The second filter 20 acquires the raw values of the speed nM over a smaller filter angle than the first filter 12. In practice, the second filter 20 has a filter angle of, for example, 90° crankshaft. A filter of this type is described in DE 101 22 517 C1.

The functional block diagram in FIG. 4 differs from the functional block diagram in FIG. 2 in the following ways:

A second actual speed nM2(IST) is computed by means of the second filter 20. At the summing point C, a second speed control deviation dR2 is determined from the second actual speed nM2(IST) and the speed set value nM(SL). The second speed control deviation dR2 and the second actual speed nM2(IST) are the input variables of the functional block 14. The second actual speed nM2(IST) is also the input variable for the input-output map 15 for computing the maximum injection start SB(MAX). The injection start correction dSB and the maximum injection start SB(MAX) are thus substantially determined by the second filter 20. The manner in which the closed-loop speed control system functions and the manner in which the injection start SB is computed are the same as described in connection with FIG. 2.

Figure 5:
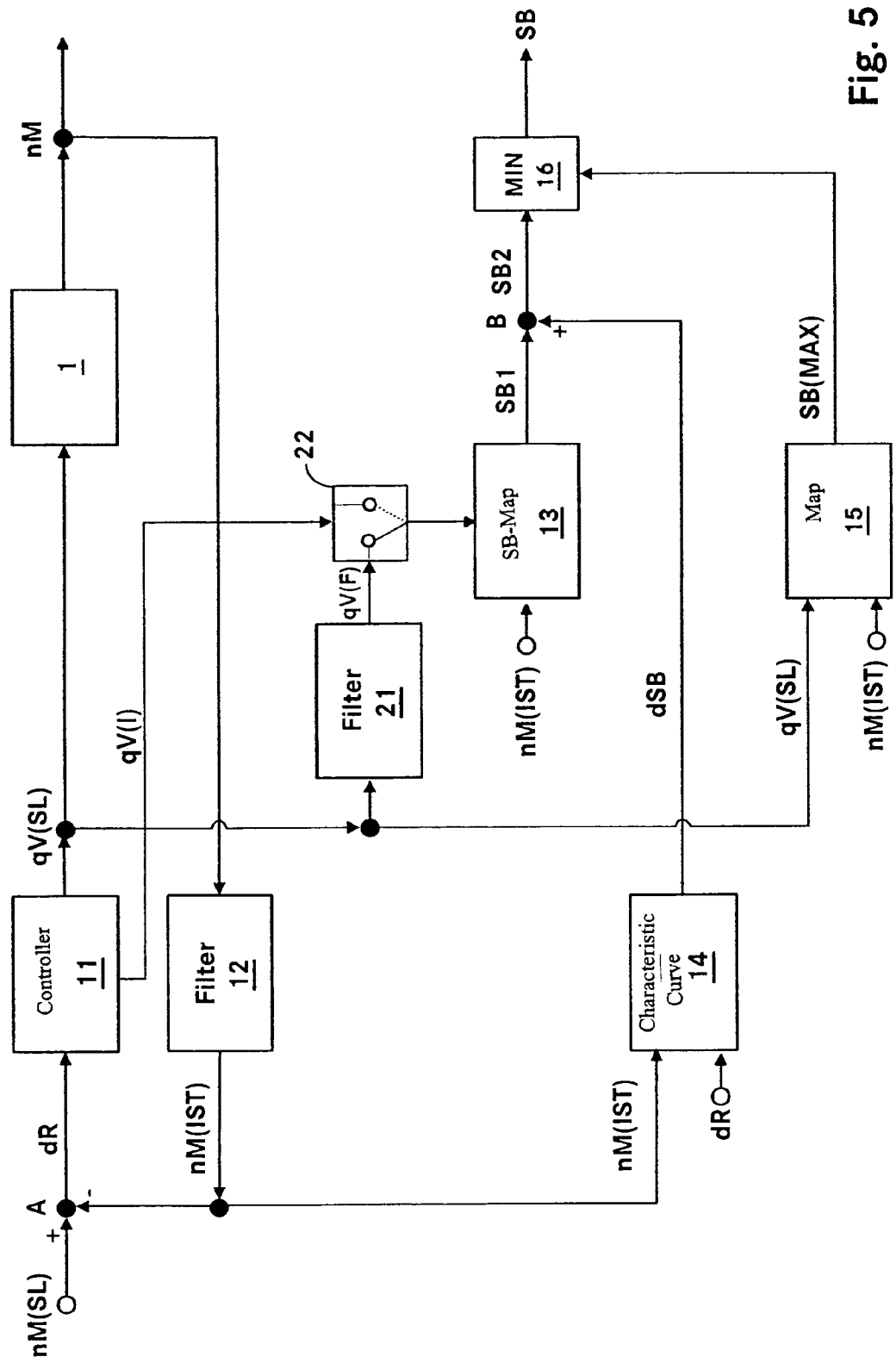
FIG. 5 shows a functional block diagram for the injection start with filtering in a first embodiment.

FIG. 5 shows a functional block diagram for computing the injection start with filtering in accordance with a first embodiment. The functional block diagram is essentially the same as the functional block diagram in FIG. 2. In contrast to the latter, a filtered input variable is supplied to the injection start input-output map 13. The filtered input variable corresponds either to a filtered set injection quantity qV(F) or to an integral portion of the set injection quantity qV(I). The filtered set injection quantity qV(F) is computed from the set injection quantity qV(SL) by means of a filter 21. The integral portion of the set injection quantity qV(I) is computed by the speed controller 11, which in practice is realized, for example, as a PIDT1 controller. The input variable of the injection start input-output map 13 is selected by a switch 22. Especially quiet engine running in steady-state operation is achieved by the filtering of the input variable of the injection start input-output map 13. The manner in which the closed-loop speed control system functions and the manner in which the injection start SB is computed are the same as described in connection with FIG. 2.

Figure 6:
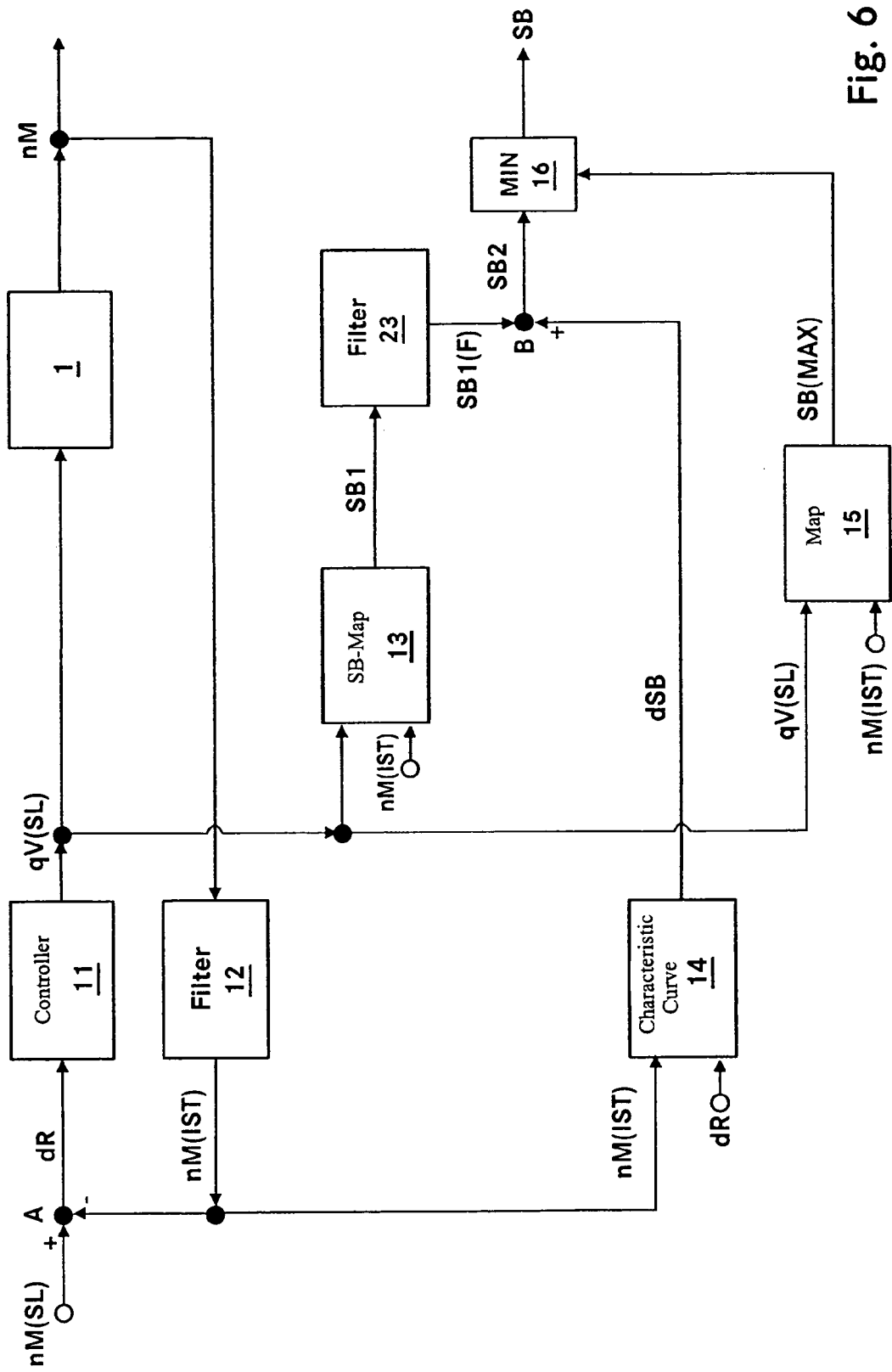
FIG. 6 shows a functional block diagram for the injection start with filtering in a second embodiment.

FIG. 6 shows a functional block diagram for determining the injection start with filtering in accordance with a second embodiment. This functional block diagram is essentially the same as the functional block diagram in FIG. 2. It differs from the latter in that the first injection start SB1 is additionally converted by a filter 23 to a first filtered injection start SB1(F), which is combined at summing point B with the injection start correction dSB. The system functions as described in connection with FIG. 2.

Figure 7A:
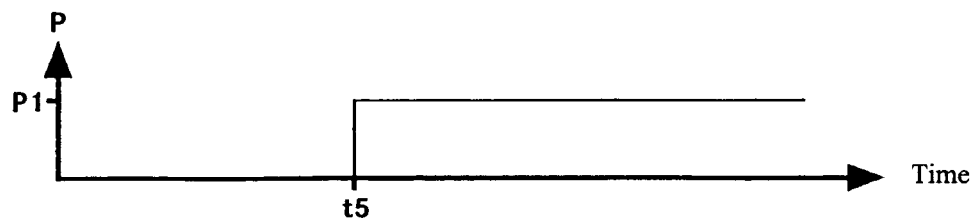
FIG. 7 shows a time diagram.
Figure 7B:
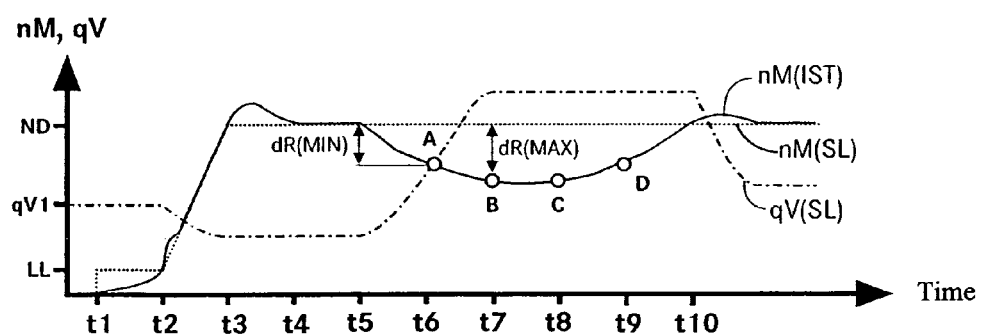
Figure 7C:
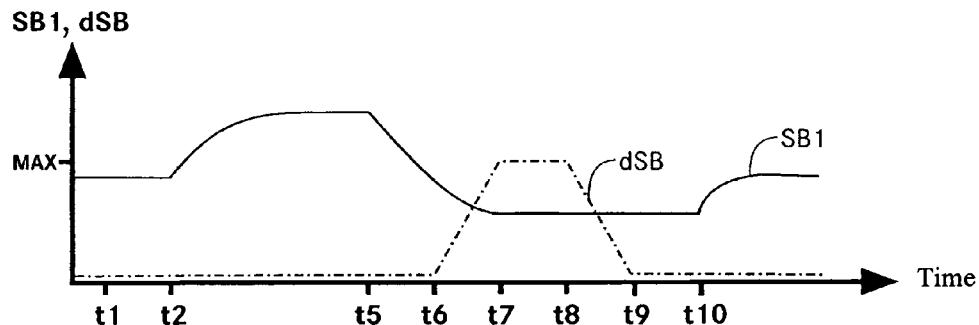
Figure 7D:
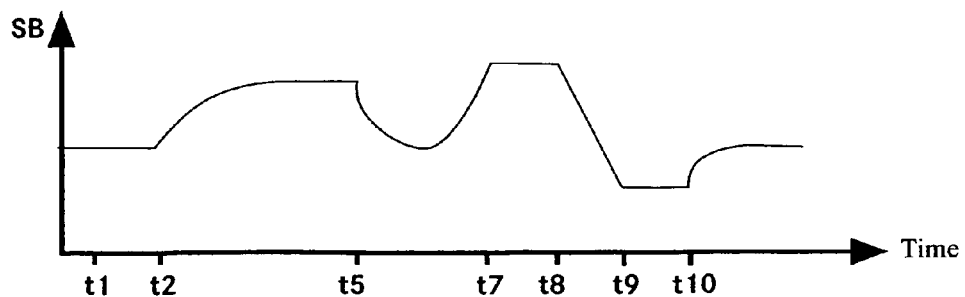

FIG. 7 has four parts 7A to 7D, which show, in each case, as a function of time: a signal power consumption P (FIG. 7A), the behavior of the set speed/actual speed nM(SL)/nM (IST) and of the set injection quantity qV(SL) (FIG. 7B), the behavior of the first injection start SB1 and the injection start correction dSB (FIG. 7C), and the behavior of the resulting injection start SB (FIG. 7D). In FIG. 7B, the actual speed nM(IST) is drawn as a solid line, the set speed nM(SL) is drawn as a dotted line, and the set injection quantity qV(SL) is drawn as a dot-dash line. In FIG. 7C, the first injection start SB1 is drawn as a solid line, and the injection start correction dSB is drawn as a dot-dash line.

At time t1, the engine start-up is initiated, and the set speed nM(SL) is set to an idling value LL. Starting at time t2, the set speed nM(SL) is ramped up to the rated speed ND, e.g., 1,500 rpm, by time t3. Starting at time t3, the set speed nM(SL) remains unchanged. The actual speed nM(IST) follows the set speed nM(SL) until time t3. However, at time t3, the actual speed nM(IST) overshoots the set speed nM(SL). The end of the run-up is recognized from the overshooting of the set speed nM(SL) by the actual speed nM(IST) after the rated speed ND has been reached. This activates the injection start correction, i.e., when the actual speed nM(IST) becomes greater than or equal to the rated speed ND, and the control deviation dR is less than or equal to zero. Starting at time t4, the actual speed nM(IST) stabilizes at the level of the rated speed ND. The internal combustion engine-generator unit is now in the steady state, in which the injection start SB is determined exclusively by the injection start input-output map 13. Consequently, the behavior of the injection start SB is identical to the behavior of the first injection start SB1.

At time t5, it is assumed that a load application occurs. At this time, the signal P in FIG. 7A changes its value from zero to a value P1. As a consequence of this load application, the actual speed nM(IST) decreases in the direction of point A. The speed controller attempts to counteract the drop in speed by increasing the correcting variable, which in this case is the set injection quantity qV(SL) (FIG. 7B). Consequently, more fuel is injected into the combustion chambers of the internal combustion engine. The drop in speed additionally causes the first injection start SB1 and the injection start SB resulting from it to decrease starting at time t5. At time t6, at point A, the actual speed nM(IST) has fallen to such an extent that the speed control deviation dR exceeds the limiting value dR(MIN). A typical value for the limiting value dR(MIN) is 5 rpm. As a result of this, a correction value dSB1 is computed by means of the characteristic curve 17 (FIG. 3), and an injection start correction dSB is output. The injection start SB is now computed from the sum of the first injection start SB1 and the injection start correction dSB. That is, it is shifted towards early.

At time t7, at point B, the speed control deviation dR corresponds to a maximum value dR(MAX). A typical value for the maximum value dR(MAX) is 20 rpm. The characteristic curve 17 (FIG. 3) is constructed, for example, in such a way that the correction value dSB1 assumes the value MAX when the speed control deviation dR exceeds the value dR(MAX). Due to the injection start correction, the internal combustion engine-generator unit starts to recover in the time frame t7/t8, i.e., the actual speed nM(IST) increases towards the set speed nM(SL). Therefore, in the time frame t8/t9, the speed control deviation dR decreases from the value dR(MAX) to the value dR(MIN). As a result, the injection start correction dSB is reduced from the value MAX back to the value zero. Since the first injection start SB1 remains constant during this period, the injection start SB corrects itself accordingly. At time t10, the actual speed nM(IST) again corresponds to the set speed nM(SL). Due to the now negative control deviation dR, the speed controller reduces the set injection quantity qV(SL) starting at time t10. The behavior of the first injection start SB1 and the injection start SB corresponds to this behavior.

The invention thus has the following functionality: The end of the run-up ramp is detected due to the control deviation, time t3. At this time, the injection start correction is activated. In the steady-state operating state (time frame t4/t5), the injection start SB corresponds to the first injection start SB1. When a load application is detected, the first injection start SB1 is shifted by means of the injection start correction. The injection start is shifted to early crankshaft angles, i.e., the injection occurs at an earlier time. To protect the internal combustion engine, the injection start correction dSB is limited to the value MAX. With increasing recovery of the internal combustion engine-generator unit, the injection start correction dSB is reduced again.

Figure 8:
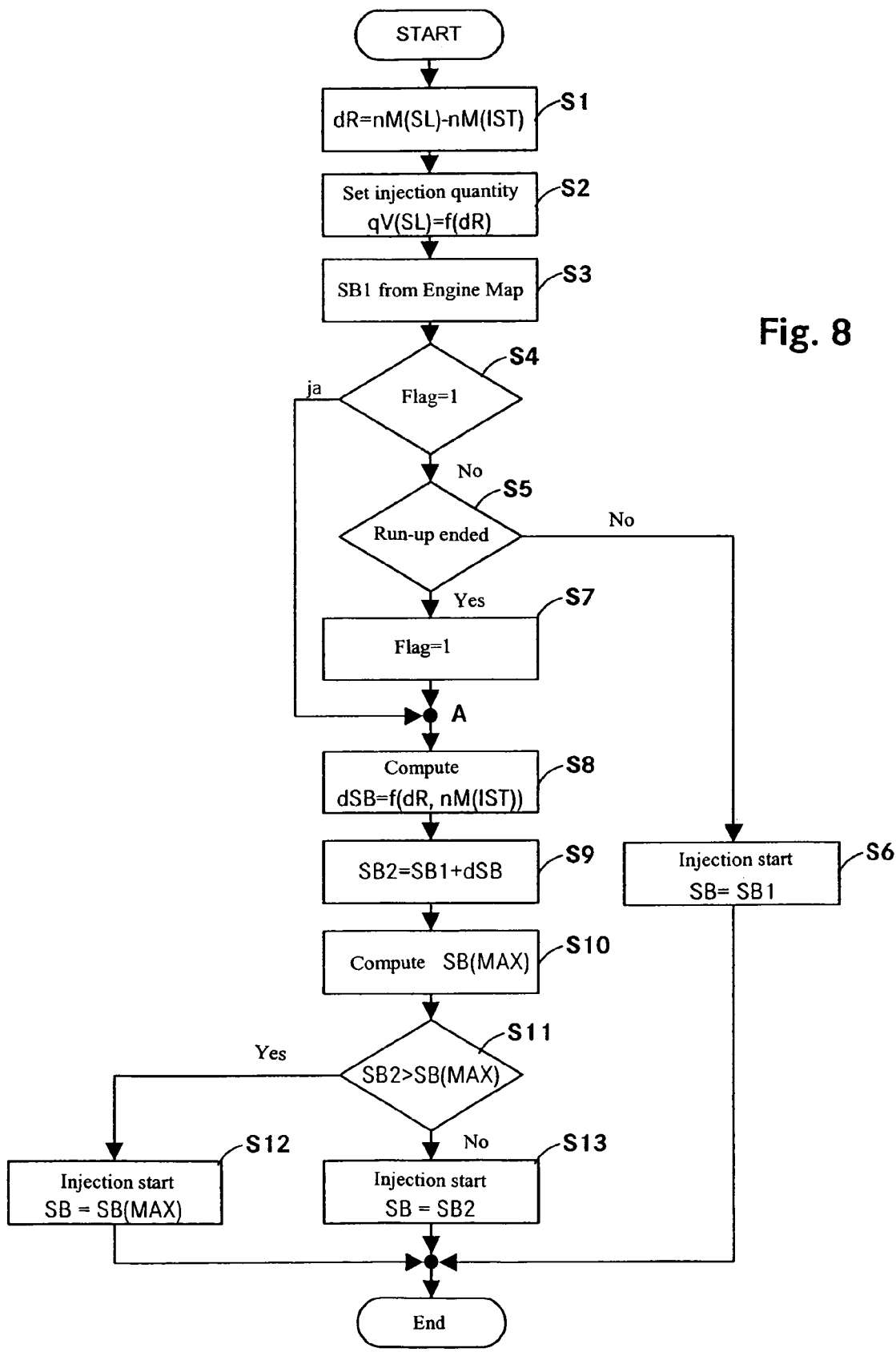
FIG. 8 shows a program flowchart.

FIG. 8 shows a program flowchart of the automatic control method. At S1, the speed control deviation dR is determined from a comparison of the set speed and the actual speed. At S2, a set injection quantity qV(SL) is computed by the speed controller as a function of the speed control deviation dR. At S3, the first injection start SB1 is computed by means of the injection start input-output map as a function of the set injection quantity qV(SL) and the actual speed nM(IST). At S4, a check is made to determine whether a flag has the value 1. If the value is equal to one, then the program flow passes to point A. If the flag has the value 0, then a check is made at S5 to determine whether the run-up has ended. An end of the run-up is recognized when the actual speed is greater than or equal to the rated speed ND, and the speed control deviation dR is less than or equal to zero.

If it is recognized at S5 that the run-up has not yet ended, then at S6 the injection start SB is set to the value of the first injection start SB1. If the run-up has ended, then at S7 the flag is set to the value 1, and then at S8 the injection start correction dSB is determined as a function of the speed control deviation dR and the actual speed nM(IST). At S9, the second injection start SB2 is computed from the addition of the first injection start SB1 and the injection start correction dSB. At S10, the maximum value SB(MAX) is computed, and at S1, a check is made to determine whether the second injection start SB2 is greater than the maximum injection start SB(MAX). If this is the case, then at S12 the injection start SB is limited to the value SB(MAX). If the value SB2 is less than the maximum value SB(MAX), then at S13 the injection start SB is set to the value of the second injection start SB2. The program flowchart then ends.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for automatic control of an internal combustion engine-generator unit comprising the steps of: determining a speed control deviation (dR) from a set speed and an actual speed (nM(SL), nM(IST)) of the internal combustion engine; computing a set injection quantity qV(SL) from the speed control deviation (dR) by means of a speed controller as a correcting variable for the automatic speed control of the internal combustion engine; and, when a load application is detected, shifting an injection start (SB) towards early in a direction of larger crankshaft angles before top dead center, the injection start (SB) being adjusted by computing a first injection start (SB1) by means of an injection start input-output map and varying the first injection start by an injection start correction (dSB) as a function of the speed control deviation (dR).

2. The method in accordance with claim 1, including limiting the injection start (SB) to a maximum injection start (SB(MAX)).

3. The method in accordance with claim 2, including computing the maximum injection start (SB(MAX)) as a function of the set injection quantity (qV(SL)) and the actual speed (nM(IST)).

4. The method in accordance with claim 1, including computing the injection start correction (dSB) by means of a characteristic curve, which is realized in such a way that a correction value (dSB1) greater than zero is computed when the control deviation (dR) becomes greater than a limiting value (dr(MIN)) (dR>dr(MIN)).

5. The method in accordance with claim 4, including first activating the injection start correction (dSB) when an end of a run-up of the internal combustion engine (2) is detected.

6. The method in accordance with claim 5, including recognizing the end of the run-up when the actual speed (nM(IST)) is greater than or equal to a rated speed (ND), and the speed control deviation (dR) is less than or equal to zero (dR≦0).

7. The method in accordance with claim 1, further including computing a second actual speed (nM2(IST)) by means of a second filter from the speed (nM) of the internal combustion engine, determining a second speed control deviation (dR2) from the set speed (nM(SL)) and the second actual speed (nM2(IST)), and computing the injection start correction (dSB) and a maximum injection start (SB(MAX)) as a function of the second control deviation (dR2).

8. The method in accordance with claim 1, including computing the first injection start (SB1) as a function of a filtered set injection quantity (qV(F)) or as a function of an integral portion of a set injection quantity (qV(I)).

9. The method in accordance with claim 1, including converting the first injection start (SB1) by a filter.

* * * * *